Dec. 8, 1959 R. E. SPENCER 2,916,734
APPARATUS FOR CONVERTING DIGITAL CODE SIGNALS TO ANALOGUE SIGNALS
Original Filed Jan. 29, 1951
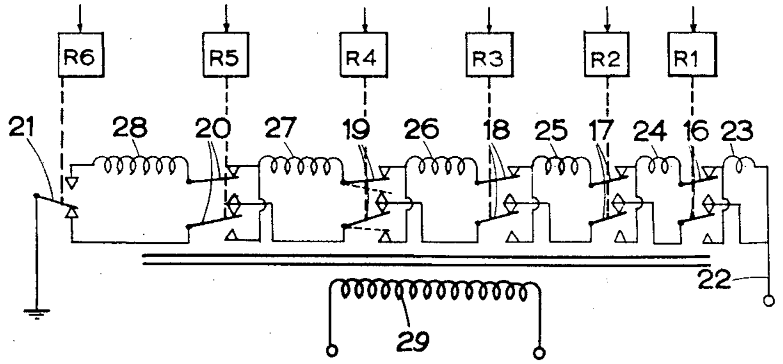
Inventor
R. E. Spencer
By Glascock Downing & Seebold
Attys.

United States Patent Office 2,916,734

Patented Dec. 8, 1959

2,916,734

APPARATUS FOR CONVERTING DIGITAL CODE SIGNALS TO ANALOGUE SIGNALS

Rolf Edmund Spencer, West Ealing, London, England, assignor to Electric & Musical Industries Limited, Hayes, Middlesex, England, a company of Great Britain Original application January 29, 1951, Serial No. 208,297, now Patent No. 2,882,524, dated April 14, 1959. Divided and this application July 29, 1955, Serial No. 525,258

Claims priority, application Great Britain January 31, 1950

5 Claims. (Cl. 340—347)

This is a divisional application from United States application Serial No. 208,297 filed January 29, 1951, now Patent No. 2,882,524, April 14, 1959.

This invention relates to apparatus for converting digital code signals, especially binary digital code signals, to analogue signals.

In some forms of computing devices it may be necessary to convert signals representing a number coded in a digital code to a signal which is an analogue of that number. For example in a proposed form of device, the signals to be converted represent the number in a binary code, the elements being in that case successive integral powers of two.

The object of the present invention is to provide relatively simple apparatus for converting digital code signals to analogue signals, especially, although not exclusively applicable to binary code signals.

According to the present invention there is provided apparatus for converting digital code signals to analogue signals comprising a series of voltage sources for setting up electro-motive forces respectively representing different elements of a digital code, and means responsive to applied signals representing a number coded in said digital code for selectively inserting said voltage sources in a series chain in such manner that the electro-motive force set up across the series chain is an analogue of said number.

In order that the invention may be clearly understood and readily carried into effect, the invention will be described with reference to the accompanying drawing which illustrates apparatus for converting a binary code representation to an analogue representation, in accordance with one example of the present invention.

Referring to the drawing, a binary pulse code representation of a number which is to be converted to an analoglue representation is applied to a bank of relays R1 . . . R6. The relays represent elements of successively higher order of a binary digital code so that the relay R1 represents $2^0$, the relay R2 represents $2^1$, and so on. The apparatus shown in the drawing is constructed for use in a computor in which, for reasons not connected with the present invention, numbers to be converted are encoded in the cyclic permutation binary code. Therefore the apparatus shown is constructed for the conversion of numbers thus coded, though it would be obvious to those skilled in the art that numbers coded in conventional binary code can be converted by similar apparatus with some simplification of the switches employed. Code pulses are applied in parallel to the relays R1 . . . R6, each pulse representing a code element of value 1, and being effective to change the state of the corresponding relay from an initial state, which may be termed state "0" to another state which may be termed state "1." A record of the binary code representation is therefore set up in the bank of relays and is then converted to an alternating voltage, whose amplitude is an analogue of the number represented by the relays. As will hereinafter appear, the relays are arranged to insert selectively a plurality of voltage sources into a series chain, the voltage sources representing the different elements, that is $2^0$, $2^1$, $2^2$, and so on, of the binary digital code so that the electro-motive force which is set up across the series chain has an amplitude which is the required analogue.

The cyclic permutation binary code form of decimal numbers is as follows:

| Decimal number: | Binary number |
|---|---|
| 1 | 1 |
| 2 | 11 |
| 3 | 10 |
| 4 | 110 |
| 5 | 111 |
| 6 | 101 |
| 7 | 100 |
| . . . | . . . |

and so on.

In order to transform a number coded in the cyclic permutation binary code, so that an analogue can be derived directly by summing representations of the elements employed in the coded form of the number, it is merely necessary to invert the value of the digit of a given order if an odd number of digits of higher order, in the cyclic permutation binary coded form of the number, has or have the valve 1, but not otherwise. It is to be understood that a digit of value 1 when inverted becomes 0, and a digit of value 0 when inverted becomes 1. For example 101 in the cyclic permutation binary code becomes 110 in the conventional binary code. Following the same rule 1011 in the cyclic permutation binary code becomes 1101 in the conventional binary code and represents the decimal number 13.

References 16 . . . 21 indicate a set of switches which are operated by the bank of the relays R1 . . . R6. The switches control a conductive path between ground and an output terminal 22 into which may be inserted in series successive transformer secondary windings 23 . . . 28. The secondary windings have a common primary winding 29 and it will be assumed that this primary winding is energised by means of an alternating voltage of predetermined amplitude. The use of a common primary winding ensures an accurate phase relationship between the electro-motive forces set up across the secondary windings. The secondary windings 23 . . . 28 are arranged to have such a number of turns that the E.M.F. induced across each secondary winding due to coupling with the primary winding is twice the E.M.F. induced across the next preceding secondary winding. The secondary windings thus constitute the aforesaid voltage sources for setting up electro-motive forces respectively representing the different elements of the binary digital code. It is arranged that each of the switches 16 . . . 21 is normally in the state indicated by full lines (termed state "0") when the corresponding relay is in state "0" but is changed to the alternate state (termed state "1"), which is represented by the dotted lines in the case of switch 19, when the corresponding relay is in state "1."

In describing the operation of the arrangement shown it will be assumed that the relay R4 has been changed to state "1" whilst the other relays have remained in state "0", so that the number corresponding to 001000 in the cyclic permutation binary digital code has to be converted to an analogue. When the relay R4 is changed to state "1" the switch 19 is changed to the state indicated by the dotted lines. This inserts the secondary winding 26 into the conductive path between the output terminal 22 and ground and the construction of the switches 16 to 21 is such that the secondary windings 23, 24 and 25 are also inserted in series in said conductive path. An alternating E.M.F. is therefore set up between the terminal 22 and ground which has an amplitude proportional to $2^3+2^2+2^1+2^0$, namely the decimal number 15 which corresponds to 001000 in the cyclic permutation binary code, as required. As a further example, assume that the relays R4, R2 and R1 are changed to state "1" whilst the other relays remain in state "0". The number to be converted to an analogue then corresponds to 001011 in the cyclic permutation binary code. The switches 16, 17 and 19 are changed to state "1" in response to the corresponding relays. The secondary winding 26 is inserted in the conductive path between the terminal 22 and ground and this has the effect of inverting the effect of switch 18 and inserting the secondary winding 25 although the switch 18 remains in state "0". It also inverts the effect of switch 17 and winding 24 remains open-circuited, although switch 17 is in state "1". On the other hand winding 23 is inserted in the series chain by switch 16 when it is changed to state "1". The amplitude of resultant electro-motive forces set up between the terminal 22 and ground is therefore proportional to $2^3+2^2+2^0$ namely the decimal number 13 which is the correct analogue. It will now be apparent that the switches 16 to 21 are so constructed that the effect of a switch corresponding to a code element of given order is inverted if, and only if an odd number of switches corresponding to code elements of higher order is or are in state "1". Therefore although the positions of the switches represent a number in cyclic permutation binary digital code, the conditions of the transformer windings 23 to 28 represent the number in conventional binary code. The required voltage analogue is then correctly the sum of the separate electro-motive forces inserted in series between the output terminal 22 and ground.

What I claim is:

1. Apparatus for converting digital code signals to analogue signals comprising a series of transformer secondary windings, transformer primary means for inducing electro-motive forces across said secondary windings, said secondary windings having different turns ratios whereby the primary means induces electromotive forces respectively representing the different elements of a digital code, and switch means responsive to the different elements of applied signals representing a number coded in said digital code for connecting selected secondary windings in a series chain, in such a manner that the electro-motive force set up across the series chain has a value which is an analogue of said number.

2. Apparatus for converting binary code signals to analogue signals comprising a series of transformer secondary windings, transformer primary means for inducing electro-motive forces across said secondary windings, said primary means and secondary windings having predetermined ratios to induce in said secondary windings electro-motive forces respectively representing successive integral powers of two, and switch means responsive to the different elements of applied signals representing a number coded in binary code for connecting selected secondary windings in a series chain, in such manner that the electro-motive force set up across the series chain has a value which is an analogue of said number.

3. Apparatus according to claim 2 wherein said switch means comprises a switch in circuit with each secondary winding for selectively connecting the windings in said series chain, or open-circuiting said windings, said switches comprising reversing switches connected to reverse the effect of a switch corresponding to a code element of a given order if, and only if, an odd number of switches corresponding to code elements of higher order is or are in the state representing a binary digit of value 1, whereby the apparatus is adapted for converting signals in cyclic permutation binary code to analogue signals.

4. Apparatus according to claim 2 wherein said primary means comprises a single winding common to said secondary windings, and the number of turns on the secondary windings are predetermined to represent the corresponding elements of the binary digital code.

5. Apparatus for converting digital code signals to analogue signals comprising a series of transformer secondary winding portions, transformer primary means for inducing electro-motive forces across said secondary winding portions, said secondary winding portions comprised of different turns whereby the primary means induces therein electro-motive forces respectively representing the different elements of a digital code, and switch means responsive to the different elements of applied signals representing a number coded in said digital code for coupling together selected secondary winding portions to produce a resultant electro-motive force having a value which is an analogue of said number.

References Cited in the file of this patent

UNITED STATES PATENTS

| | | |
|---|---|---|
| 2,023,221 | Fischer | Dec. 3, 1935 |
| 2,570,221 | Earp | Oct. 9, 1951 |
| 2,571,680 | Carbrey | Oct. 16, 1951 |
| 2,738,504 | Gray | Mar. 13, 1956 |